Feb. 10, 1959 C. E. McWHORTER 2,873,021
BELT CONVEYOR AND ARTICULATOR THEREFOR
Filed Aug. 23, 1956 5 Sheets-Sheet 1
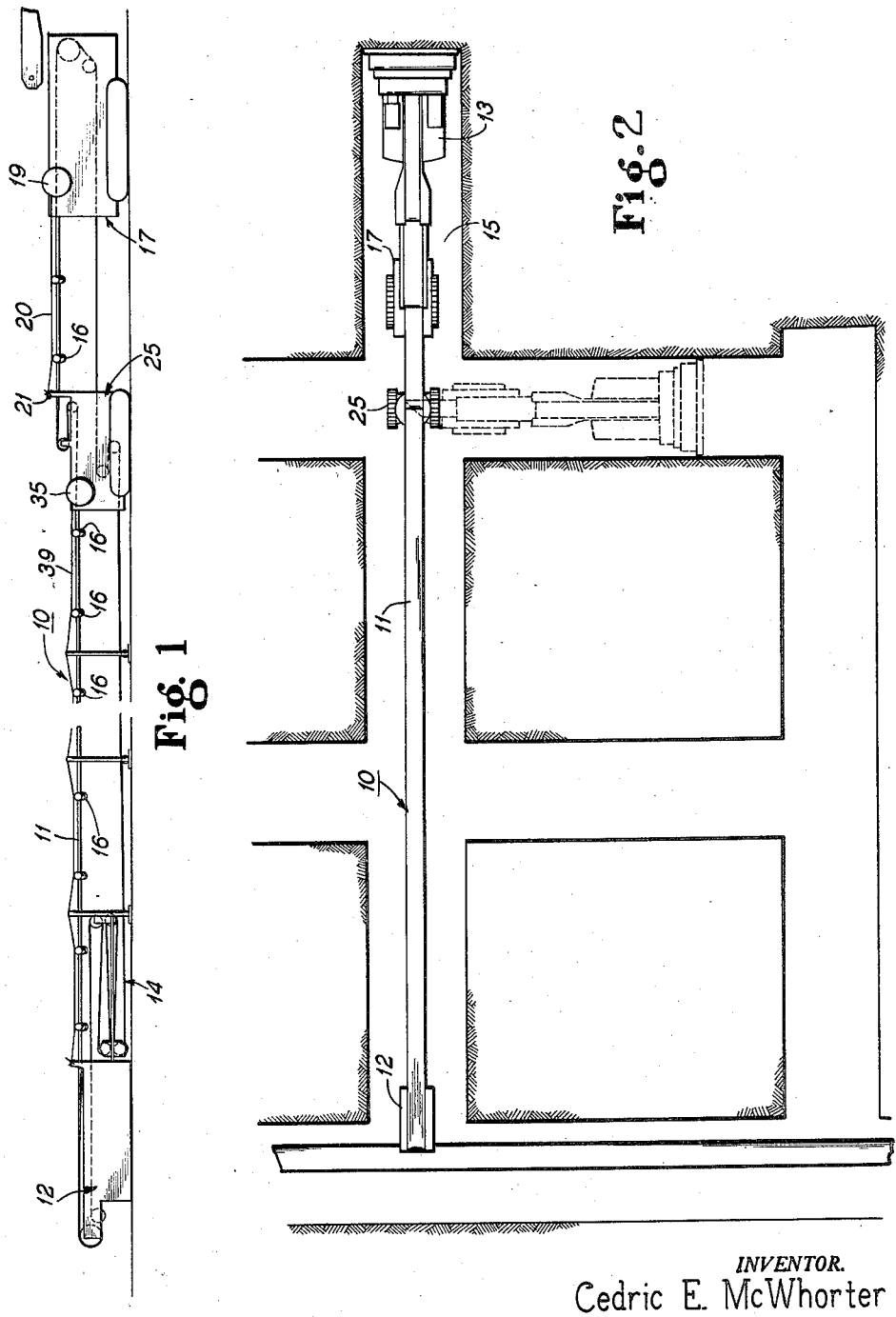
INVENTOR.
Cedric E. McWhorter
BY
Murray G. Gleeson
ATTORNEY Feb. 10, 1959 — C. E. McWHORTER — 2,873,021
BELT CONVEYOR AND ARTICULATOR THEREFOR
Filed Aug. 23, 1956 — 5 Sheets-Sheet 2

INVENTOR.
Cedric E. McWhorter
BY
Murray A. Gleeson
ATTORNEY

INVENTOR.
Cedric E. McWhorter
BY
Murray A. Gleeson
ATTORNEY

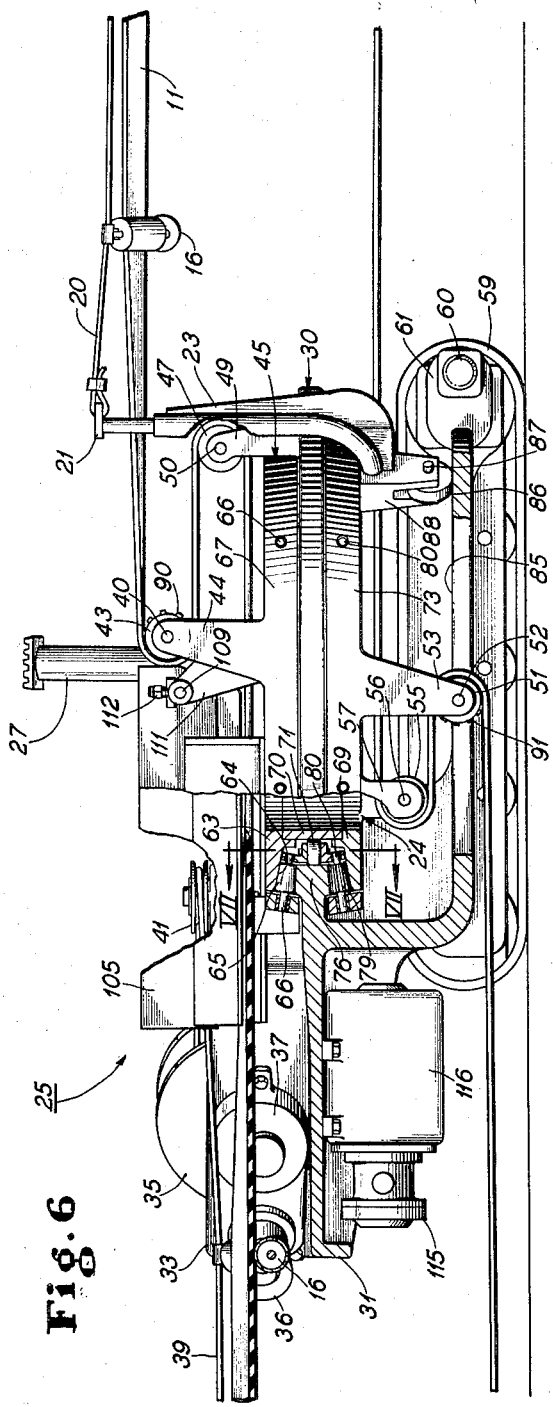

2,873,021
BELT CONVEYOR AND ARTICULATOR THEREFOR

Cedric E. McWhorter, Hinsdale, Ill., assignor to Goodman Manufacturing Company, Chicago, Ill., a corporation of Illinois Application August 23, 1956, Serial No. 605,805

14 Claims. (Cl. 198—109)

This invention relates to improvements in belt conveyors and more particularly relates to an articulated continuous belt conveyor suitable for continuously conveying coal from a continuous mining machine and the like operating in mines underground.

A principal object of the invention is to provide an improved form of continuous belt conveyor in which the conveyor is so supported intermediate its ends as to accommodate lateral adjustable movement of one end portion of the conveyor with respect to the other without interrupting the flow of material along the conveyor.

A further object of the invention is to provide an articulated connection for a belt conveyor accommodating lateral movement of the inby end of the conveyor with respect to the outby end thereof to continuously carry coal away from a continuous miner and the like upon various positions of lateral displacement of the miner with respect to the discharge end of the conveyor.

Still another object of the invention is to improve upon the belt conveyors heretofore used in mines underground by providing an intermediate support for the upper and lower runs of the belt having horizontally swingable rollers about which the belt is reeved and laterally movable at half the angle of lateral swinging movement of the inby end of the belt, to guide the belt in its various positions of lateral displacement to continuously carry loose material therealong over the region of articulation of the belt without interruption in the flow of the loose material.

A still further object of the invention is to provide an extensible articulated belt conveyor so arranged as to advance with a continuous mining machine and the like and to swing laterally to carry material away from the machine when at various angles of lateral displacement with respect to the outby end of the belt.

These and other objects of the invention will appear from time to time as the following specification proceeds and with reference to the accompanying drawings wherein:

Figure 1 is a view in side elevation diagrammatically illustrating a belt conveyor constructed in accordance with the invention;

Figure 2 is a diagrammatic plan view of a section of a mine showing an extensible articulated conveyor constructed in accordance with the invention advancing with a continuous miner, and diagrammatically illustrating by broken lines the conveyor advancing with a continuous miner positioned at right angles with respect to the outby end of the conveyor;

Figure 6 is a fragmentary longitudinal sectional view taken substantially along line VI—VI of Figure 5;

Figure 7 is an enlarged partial fragmentary sectional view taken substantially along lines VII—VII of Figure 6 and showing certain details of the supports and turning means for the articulating idlers for the belt;

Figure 8 is a partial fragmentary sectional view taken substantially along line VIII—VIII of Figure 7 and showing certain other details of the supports for the articulating idlers not shown in Figure 7;

Figure 3:
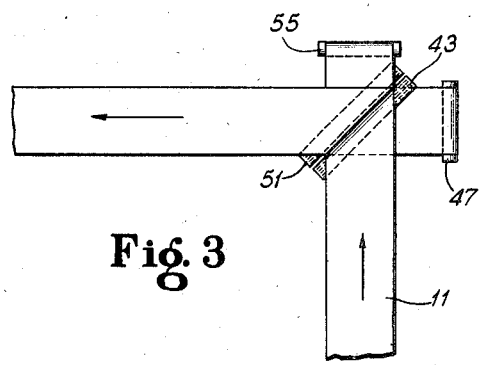
Figure 3 is a diagrammatic view showing the positions of the articulating idlers for the belt when the belt is positioned to convey material about a right angled corner.

In Figures 1 and 2 of the drawings, I have shown an extensible belt conveyor 10 extending along a mine entry and including an endless conveyor belt 11 driven at its outby or discharge end by suitable drive mechanism (not shown) contained within a drive or head frame structure 12, which supports the drive mechanism for the belt and has a framework 14 in advance thereof, which serves to store the belt and to accommodate extension of the conveyor to follow a continuous mining machine 13, shown in Figure 2 as mining out a cross entry 15. The conveyor 10 may be of any well known form and is herein shown for the purpose of illustrating the invention as being a rope type of belt conveyor in which the belt is supported on spaced troughed idlers 16 supported on wire ropes maintained under tension, as in a joint application of Joseph Craggs and Keith McCann, Serial No. 548,622, filed November 23, 1955.

At the inby end of the conveyor is an idler or tail frame structure 17 supporting the idlers for reversing the direction of travel of the belt and also supporting take-up drums 19 at each side of said frame. The take-up drums 19 have idler supporting cables 20, for the inby troughed idlers 16, wound thereon and preferably driven by hydraulic power to maintain tension on said cables and on the conveyor belt 11.

The idlers 16 are spaced along the cables 20 wound on the drums 19. Said cables are connected at their outby ends to connectors 21 at the upper ends of upright arms 23 extending upwardly from a turntable 24 of a swivel or belt articulator structure 25. The belt articulator structure 25 may be held in stationary relation with respect to the ground by suitable roof jacks 27, shown as being connected to connectors 29, extending laterally from opposite sides of a frame 30 for the belt articulator structure 25, for holding said belt articulator structure in position. Similar jacks may be provided to hold the inby idler frame structure 17 and the outby drive frame structure 12 stationary.

The frame 30 of the belt articulator structure is shown as having a generally fan shaped rear end portion 31 extending beneath the upper run of the belt 11 and having flaring vertical side walls 33 having take-up drums 35 mounted thereon on the outside of said side walls. The take-up drums 35 are driven through independent fluid motors 36 mounted on speed reducers 37 extending along the insides of the flaring walls 33 and secured thereto. The speed reducers 37 may be of any well known form and serve to drive the drums 35 from the motors 36 to take up tension on flexible cables 39 wound thereon and forming a support for the spaced troughed idlers 16. The flexible cables 39 are connected at their free ends to the outby frame structure 12 and are maintained under tension by the fluid motors 36.

Fluid under pressure may be supplied to the fluid motors 36 through a suitable hydraulic control system, such as is shown and described in an application Serial No. 587,266, filed by Melvin G. Carlson on May 25, 1956 and no part of the present invention so not herein shown or described further.

Figure 5:
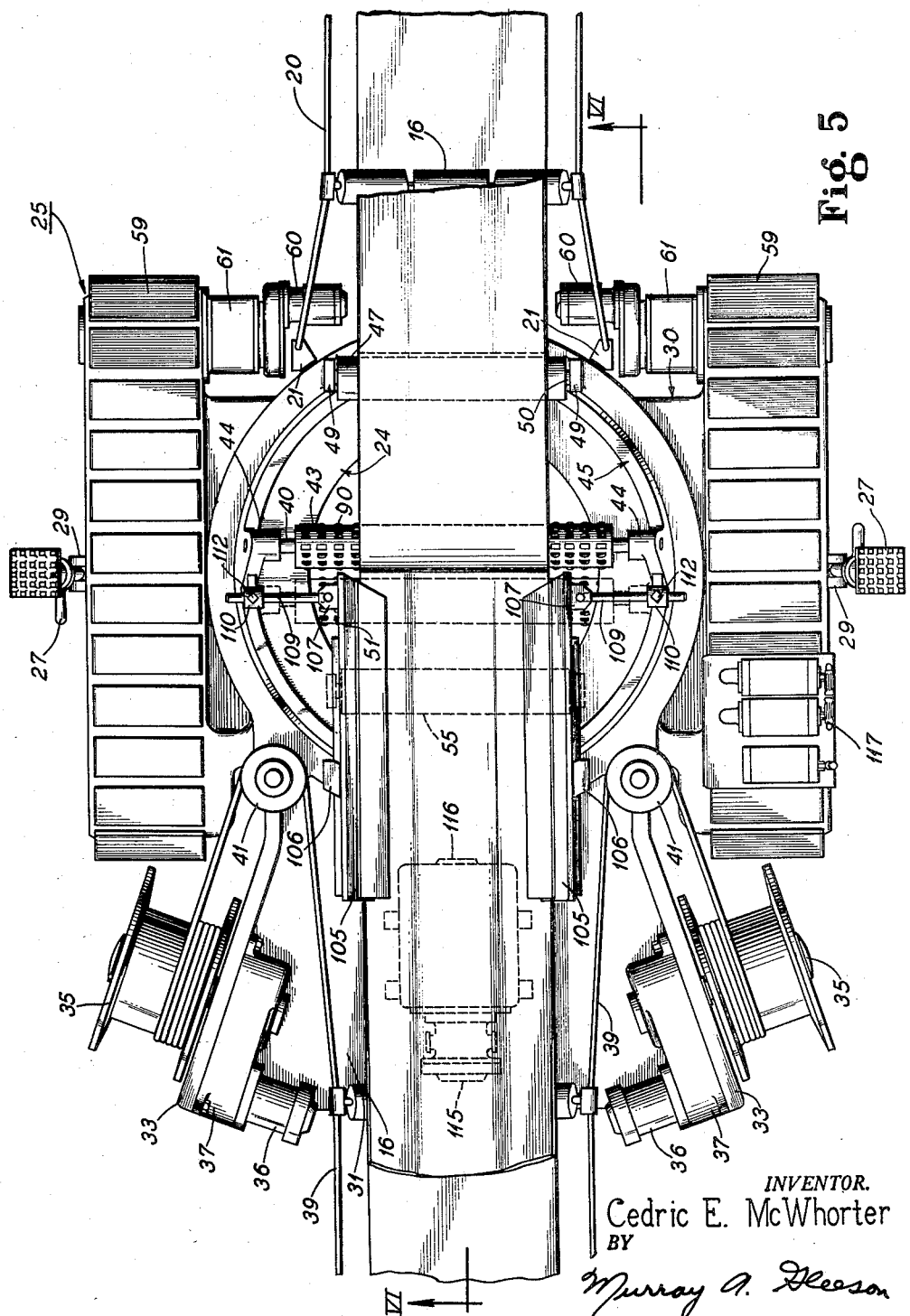
Figure 5 is a top plan view of a belt swivel or articulated connecting device constructed in accordance with the invention showing the inby and outby ends of the belt in aligned relation with respect to each other.

As shown in Figure 5, the flexible cables 39 are trained in a forward direction from the drums 35 around direction changing idlers 41 and rearwardly from said idlers to the outby or drive frame structure 12 and serve as the sole support for the outby end portion of the endless conveyor belt 11 and also accommodate extension of the belt as the idler frame structure 17 and the belt articulator structure 25 are advanced by the paying off cable from the take-up drums 35, as shown and described in the aforementioned Craggs and McCann application Serial No. 548,622.

Figure 4:
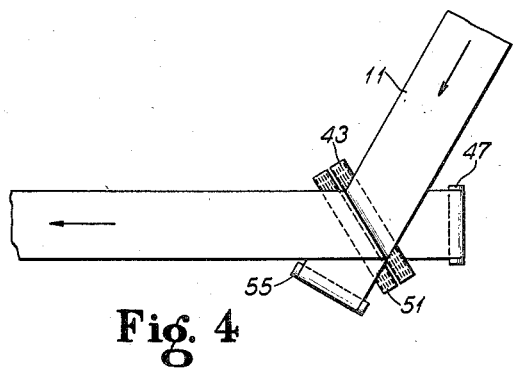
Figure 4 is a view somewhat similar to Figure 3, but showing the inby end of the belt displaced at an angle of 60° with respect to the outby end thereof.

Referring now to Figures 3, 4 and 6 illustrating the general principles of the belt articulator structure of the invention, the upper run of the inby portion of the belt is trained about an angularly movable articulator idler 43 mounted on a horizontal shaft 40 mounted at its ends on spaced upright arms 44 extending upwardly from a turntable 45 movable with the turntable 24 about the axis of turning movement thereof at half the travel thereof. The idler 43 forms a bight in the belt 11 positioning the belt to discharge thereover in cascade arrangement with respect to the outby portion of the belt extending to the drive section 12 and spaced beneath the inby portion of the belt by an idler 47 forming a second bight in the upper run of the belt. The idler 47 is supported on the stationary frame 30 on upright support arms 49 and a transverse shaft 50 mounted therebetween.

The return run of the belt reverses its direction of travel about an angularly movable articulator idler 51 mounted on a transverse shaft 52 carried at its ends in spaced arms 53 depending from the turntable 45 and angularly moving with the idler 43 at the angle of movement thereof.

From the idler 51 the lower run of the belt extends rearwardly and turns about an idler 55 on a transverse shaft 56 mounted at its ends in depending arms 57 depending from the turntable 24 and traveling therewith at the angle of travel thereof and at the angle of lateral movement of the inby end of the belt.

Thus when the inby end of the belt is positioned laterally with respect to the outby end thereof about the belt articulator structure 25 and tension is taken up on the cables 20 to align the belt and space it in vertically spaced relation with respect to the ground, the tension on the cables 20 will turn the turntable 24 and the idler 55 to maintain the supports 23, connectors 21 and idler 55 in alignment with the inby end portion of the belt.

At the same time the turntable 45 will turn at half the angle of turning movement of the turntable 24, as will hereinafter be more clearly described, to angularly position the idlers 43 and 51 at half the angle of turning movement of the inby end of the belt as is clearly illustrated in Figures 3 and 4. During angular positioning of the inby end of the belt the idler 47 remains in alignment with the outby end of the belt. Thus the bights of the belt formed by the idlers 43 and 51 bisect the angle of turning movement of the inby end portion of the belt while the idlers 47 and 55, respectively, are maintained in alignment with the outby and inby end portions of the belt. The idler 43, therefore, forms an angular bight in the belt extending thereacross at half the angle of lateral swinging movement thereof and in cooperation with the stationary idler 47 cascades the inby end portion of the belt to discharge onto the outby end portion of the upper run of the belt and thus continuously convey loose material from the inby to the outby end of the conveyor with no interruption in various positions of lateral adjustment of the inby end of the conveyor with respect to the outby end thereof.

Referring now in detail to the belt articulator structure 25 and the swingable articulating support means for the belt thereon, the frame 30 is shown as being mounted on laterally spaced continuous traction tread devices 59 driven by individual fluid motors 60 driving speed reducers 61. The traction tread devices 59 may be of any well known form so need not herein be shown or described in detail.

The turntable 24 is shown in Figures 6, 7 and 8 as being in three parts and as including an upper ring section 63 having an annular frusto-conical face 64 supported on and riding along frusto-conical rollers 65 on shafts 66 inclined at the plane of the frusto-conical face 64 and journaled at their opposite ends in an upper ring section 67 for the turntable 45.

The turntable 24 also has a lower ring section 69 connected to the upper ring section 63 by means of an intermediate cylindrical section 70 rotatably guided on horizontal rollers 71 rotatably carried on vertical shafts 72 mounted at their upper ends in the upper ring section 67 for the turntable 45 and at their lower ends in a lower ring section 73 of said turntable.

The rollers 71 also engage a cylindrical wall 75 of an annular portion 76 of the frame 30 and form bearings between the cylindrical section 70 of the turntable and the cylindrical wall 75 of the frame 30.

The annular portion 76 of the frame 30 has an upper annular surface inclined at the angle of the faces of the rollers 65 and engaged thereby and supporting the turntables 24 and 45 on the frame 30.

The annular portion 76 also has downwardly facing rack teeth 77 cut integrally therewith and meshing with pinions 79 on shafts 80, journaled at their opposite ends in the lower frame section 73 of the turntable 45. The pinions 79 also mesh with rack teeth 81 cut integrally with the lower ring portion 69 of the turntable 24.

The pinions 79 carried in the turntable 45 and meshing with the stationary rack teeth 77 on the frame 30 and the rack teeth 81 on the turntable 24 act as planetary pinions and serve to drive the turntable 45 from the turntable 24. Thus, swinging movement of the turntable 24 will result in swinging movement of the turntable 45 through an angle equal to one-half the angle of movement of the turntable 24, to position the idlers 43 and 51 at half the angle of swing of the inby end portion of the belt conveyor.

Spaced beneath the annular portion 76 of the frame 30 is an annular support track 85 forming a support for rollers 86 journaled on shafts 87 carried at their ends in forks 88 depending from the lower frame section 69 of the turntable 24 and shown as having the upright support arms 23 extending outwardly and upwardly therefrom.

The idlers 43 and 51 are shown as having rollers 90 and 91 projecting from the respective faces thereof and shown as being anti-friction bearings mounted on chordal shafts 92 to accommodate side slippage or shifting of the belt as it reverses its direction of travel about the idlers 43 and 51 when said idlers are angularly positioned with respect to the idlers 47 and 55, as shown in Figures 3 and 4. The construction of the idlers 43 and 51 and mounting for the respective rollers or bearings 90 and 91 is the same for each idler, so one only need herein be shown and described.

Figure 9:
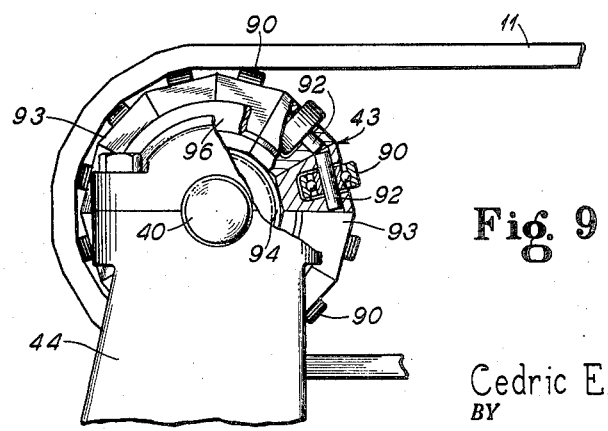
Figure 9 is an enlarged fragmentary end view of one of the articulating idlers and its support with certain parts of the idler broken away and shown in section.
Figure 10:
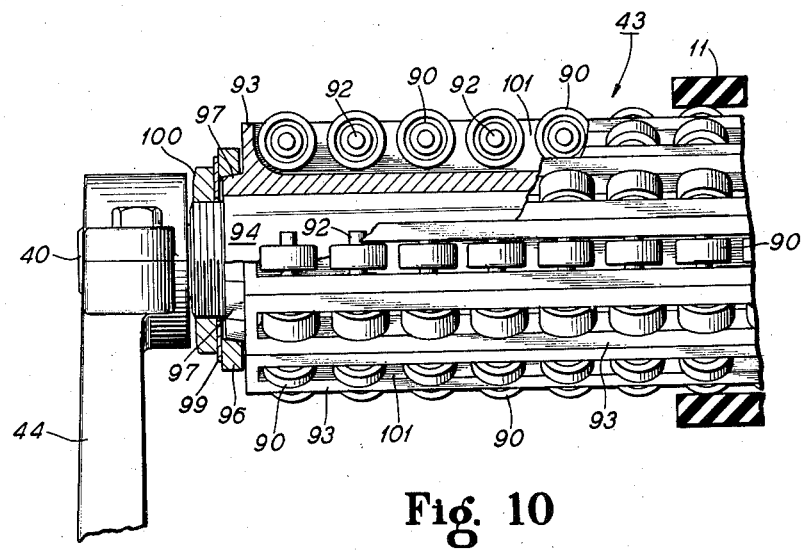
Figure 10 is a fragmentary view in side elevation of the idler shown in Figure 9 with certain parts broken away and in section.

As shown in Figures 9 and 10, the idler 43 is made up of a plurality of elongated segments 93 mounted on a core 94 having the shaft 40 extending from each end thereof and journaled in the upright support brackets 44. The segments 93 are shown as being retained to the core 94 as by retainers 96 abutting opposite shouldered end portions 97 of the segments 93. Each retainer 96 is abutted by a lock washer 99 retained to the retainer 96 as by a nut 100 threaded on the core 94. Each segment 93 has an elongated recess 101 extending therealong, having the shafts 92 carried in opposite walls thereof and forming supports for the rollers or anti-friction bearings 90.

Spill plates 105 are provided to retain loose material discharged over the bight formed by the idler 43 to the outby portion of the belt. As herein shown, the spill plates 105 extend rearwardly along the outby end portion of the belt from the bight formed by the idler 43 and lap the belt for a short portion of the length thereof. The spill plates 105 are slidably guided in guides 106 extending upwardly from the frame 30 and have lugs 107 extending laterally outwardly from the forward end portions thereof. The lugs 107 form mountings for connectors 109, connecting the spill plates 105 to the turntable 45. The connectors 109 are shown as slidably extending through bosses 110 at the upper end portions of upright supports 111 projecting upwardly from the turntable 45 and angularly rearwardly from the support arms 44. Set screws 112 are provided to hold the connectors 109 in position and to accommodate adjustment of the spill plates 105 to position the forward ends of said spill plates adjacent the bight of the belt passing over the idler 43, as the inby end of the conveyor is laterally adjusted with respect to the outby end thereof.

Fluid under pressure is supplied to the motors 36 and 60 to propel the articulator structure 25, to maintain tension on the cables 39 and wind said cables on the drums 35 and to accommodate the paying off of said cables from the drums 35 upon extension of the articulator structure and the belt 11, by means of a fluid pump 115 driven by a motor 116 secured to and depending from the fan-like rear end portion 31 of the frame 30, under the control of valves 117, shown as being mounted on the frame 30 and extending above the right hand continuous traction tread device 59. A suitable fluid storage tank (not shown) may also be provided on the frame 30. The valves 117, pump 115, motors 36 and 60 and the fluid pressure system for operating said motors under control of the valves 117 and for maintaining tension on the support cables for the belt idlers are no part of the present invention so need not herein be shown or described further.

In laterally positioning the inby end of the conveyor to load from a breakthrough or cross entry at an angle with respect to the outby end portion of the conveyor, the idler or tail frame structure 17 may be first moved to the breakthrough, it being understood that tension is released from the cables 20 during repositioning of the tail frame structure. The belt articulator structure 25 may then be placed in the proper position with respect to the cross entry, preferably with the center of its turntables in alignment with the center of the cross entry. The articulator structure 25 may then be jacked in position by the jacks 27. The turntable 24 may then be manually turned to substantially align the support 23 and idler 55 with the tail frame structure and move the turntable 45 and idlers 43 and 51 at half the angle of adjustment of the inby end of the belt. The tail frame structure 17 may then be jacked in position by its jacks (not shown). The take-up drums 19 may then be operated to take-up tension on the cables 20. This will turn the turntable 24 through the reaction against the connectors 21 and upright arms 23 an amount sufficient to accurately align the idler 55 and connectors 21 with the inby end portion of the belt. Tension may then be maintained on the cables 20 by the winding drums 19 and the hydraulic control and drive mechanism therefor. The conveyor is then in position to load along the breakthrough as shown by dotted lines in Figure 1 and to carry away the mined material from the continuous miner 13 without interruption.

It will be understood that various modifications and variations of the foregoing invention may be effected without departing from the spirit and scope of the novel concepts thereof.

I claim as my invention:

1. In an articulator for conveyors, an endless conveyor belt, an articulator frame positioned intermediate the ends of the conveyor belt and forming a support for the upper and lower runs thereof and accommodating lateral adjustment of the inby end of the belt with respect to the outby end thereof, vertically spaced sets of first and second idler means on said articulator frame forming longitudinally spaced bights in the upper and lower runs of the belt, means angularly moving the first of said idler means with respect to the second of said idler means to angularly form the bights of the belt formed about the first of said idler means to extend at half the angle of adjustable movement of the belt upon the lateral adjustment thereof, means holding said articulator frame in stationary relation with respect to the ground, and flexible cables reacting against said articulator frame in opposite directions and maintaining tension on the inby and outby ends of the belt.

2. In an articulated conveyor, a drive frame structure at the outby end of the conveyor, an idler frame structure at the inby end of the conveyor and an articulator structure intermediate the ends of the conveyor, an endless belt trained about said structures and driven at said drive frame structure, means on said articulator structure accommodating angular adjustment of the inby end of said belt with respect to the outby end thereof comprising two sets of vertically spaced first and second idler means forming spaced bights in the upper and lower runs of the belt, means angularly moving the first of said idler means with respect to the second of said idler means at half the angle of lateral adjustment of the inby end of the conveyor upon laterally adjustable movement thereof, means maintaining said articulator structure in stationary relation with respect to the ground, and support cables for the belt reacting against said articulator structure in opposite directions, for maintaining the belt in vertically spaced relation with respect to the ground.

3. In an articulator for a belt conveyor, an endless belt having an inby and an outby end, two vertically spaced sets of longitudinally spaced idlers, a first set having the upper run of the belt reeved thereabout and a second set having the lower run of the belt reeved thereabout and reeving the upper and lower runs of the belt into two longitudinally and vertically spaced bights, the idlers forming the upper bight of the upper run of the belt and the lower bight of the lower run of the belt having bight forming faces adjacent a common vertical axis and being mounted for movement thereabout with respect to the idlers forming the lower bight of the upper run of the belt and the upper bight of the lower run of the belt, and means accommodating adjustable movement of the inby end of the belt with respect to the outby end thereof about said common vertical axis and moving said idlers having bight forming faces adjacent said common vertical axis about said vertical axis at half the angle of adjustment of the inby end of the belt.

4. In a belt conveyor, an endless belt having an inby and an outby end, means supporting said belt intermediate the ends thereof and accommodating lateral angular adjustable movement of the inby end of the belt with respect to the outby end thereof comprising a stationary articulator frame, a first rotatable support rotatably mounted on said frame about a vertical axis, an idler supported on said frame in advance of said first rotatable support and held from lateral movement, an idler supported on said first rotatable support rearwardly of and beneath said first mentioned idler and laterally movable with said first rotatable support, a second rotatable support rotatably supported on said articulator frame for rotatable movement about the axis of said first rotatable support, said second rotatable support having two vertically spaced horizontal idlers mounted thereon having bight forming faces adjacent the axis of rotation of said supports, the upper of said idlers on said second rotatable support cooperating with said idler mounted on said frame and forming a bight in the upper run of the belt and reeving the belt in cascade relation with respect to an outby end portion thereof and the lower of said idlers on said second rotatable support cooperating with said idler on said first rotatable support and reeving the lower run of the belt into a bight angularly movable with the bight formed by the upper of said idlers, and means turning said first rotatable support at the angle of lateral movement of the inby end of the belt and turning second rotatable support and said idlers mounted thereon at substantially half the angle of lateral adjustable movement of the inby end of the belt upon lateral adjustable movement thereof.

5. In a belt conveyor, an endless belt having an inby and outby end, articulator means supporting said belt intermediate the ends thereof and accommodating lateral angular adjustable movement of the inby with respect to the outby end of the belt comprising a stationary articulator frame, a first rotatable support rotatably mounted thereon for movement about a vertical axis, a second rotatable support, supported for rotatable movement about the axis of rotation of said first rotatable support, said second rotatable support having two vertically spaced idlers thereon, one having the upper run of the belt trained thereabout and other having the lower run of the belt trained thereabout, said first rotatable support being turnable about said vertical axis at the angle of lateral adjustment of the inby end of the conveyor, means operated by turning movement of said first rotatable support for turning said second rotatable support and the idlers mounted thereon at half the angle of turning movement of said first rotatable support, and other upper and lower idlers for said belt, the upper of said idlers being mounted on said articulator frame and the lower of said idlers being mounted on said first rotatable support, the idler on said articulator frame cooperating with the uppermost idler on said second support and forming a bight in the upper run of the belt in advance of the idler on said rotatable support, and the idler on said first rotatable support cooperating with the lowermost idler on said second support and forming a bight in the lower run of the belt spaced rearwardly of the idlers on said second rotatable support and said idler on said first rotatable support moving laterally with said first rotatable support at the angle of lateral movement of the inby end of the belt.

6. In a belt conveyor, an endless belt having an inby and an outby end, means supporting said belt intermediate the ends thereof and accommodating lateral angular adjustment of the inby end of the belt with respect to the outby end thereof comprising an articulator frame, a first turntable rotatably mounted on said frame, a second turntable rotatable about the axis of rotation of said first turntable, said second turntable having two vertically spaced idlers mounted thereon, the uppermost idler forming a bight in the upper run of the belt and the lowermost idler forming a bight in the lower run of the belt, an idler on said articulator frame and cooperating with said uppermost idler to form a bight in the upper run of the belt and arranging the outby portion of the belt in cascade relation with respect to the bight formed by said uppermost idler, an idler on said first turntable cooperating with the lowermost idler on said second turntable to form a bight in the lower run of the belt rearwardly of the bight formed in the lower run of the belt by said lowermost idler on said second turntable and movable with said first turntable at the angle of adjustable movement of the inby end of the belt, and means operated by lateral turning movement of said first turntable for turning said second turntable and the idlers supported thereon at half the angle of turning movement of the idler on said first turntable.

7. In a belt conveyor, an endless belt having an inby and outby end, means supporting said belt intermediate the ends thereof and accommodating lateral angular adjustment of the inby end of the belt with respect to the outby end thereof comprising an articulator frame, a first turntable rotatably mounted on said frame, a second turntable rotatable about the axis of rotation of said first turntable, said second turntable having two vertically spaced idlers mounted thereon, one forming a bight in the upper run of the belt and the other forming a bight in the lower run of the belt, an idler on said articulator frame cooperating with the uppermost idler on said second turntable to form a bight in the upper run of the belt and arranging the outby portion of the belt in cascade relation with respect to the bight formed by said one idler, an idler on said first turntable cooperating with the lowermost idler on said second turntable to form a bight in the lower run of the belt rearwardly of the bight formed in the lower run of the belt by said lowermost idler on said second turntable and movable with said first turntable at the angle of adjustable movement of the inby end of the belt, means operated by turning movement of said first turntable for turning said second turntable and the idlers supported thereon at half the angle of turning movement of said first turntable, and said idlers on said second turntable having rollers extending from the face thereof rotatable about chordal axes and accommodating lateral shifting movement of the belt as it passes over said idlers upon lateral angular adjustment of the inby with respect to the outby end of the belt.

8. An articulator for conveyors having an endless belt, a mobile frame having first and second turntables rotatably mounted thereon for turning movement with respect to each other about a common vertical axis, vertically spaced idlers on a second of said turntables forming bights in the upper and lower runs of the belt adjacent the axis of rotation of said turntable, an idler on said frame adjacent the forward end thereof cooperating with the uppermost idler on said second turntable to form a second bight in the upper run of the belt and cascading the upper run of the belt with respect to the first bight formed therein, an idler mounted on said first turntable and cooperating with the lowermost idler on said second turntable to form a bight in the lower run of the belt rearwardly of the bight formed by said lowermost idler on said second turntable, said first turntable being turnable at the angle of lateral angular adjustment of the inby end portion of the belt, and means driven by said first turntable upon turning movement thereof, for turning said second turntable and the idlers mounted thereon at half the angle of turning movement of said first turntable.

9. A conveyor articulator comprising a mobile base having first and second coaxial turntables rotatably mounted thereon, an endless conveyor belt supported on said turntables and having an inby end portion extending in advance of said base and an outby end portion extending rearwardly therefrom, an idler on said mobile base adjacent the forward end thereof, an idler on said first turntable beneath said first mentioned idler and disposed adjacent the rear end thereof, vertically spaced idlers on said second turntable, the uppermost of said idlers on said second turntable having the upper run of the belt reeved thereabout and the lowermost of said idlers on said second turntable having the lower run of the belt reeved thereabout, said idler on said base cooperating with the uppermost idler on said second turntable to reeve the upper run of the belt in cascade relation with respect to the bight of the belt as it passes over the uppermost of said idlers on said second turntable and said idler on said first turntable cooperating with the lowermost idler on said second turntable to reeve the lower run of the belt thereabout to form a bight in the belt as it travels about the lowermost of said idlers on said second turntable, and means operated by lateral adjustable movement of the inby end portion of the belt for moving said idler on said first turntable therewith and for turning said second turntable at half the angle of lateral adjustable movement of the belt.

10. A conveyor articulator comprising a mobile base having first and second coaxial turntables rotatably mounted thereon, an endless conveyor belt supported on said turntables and having an inby end portion extending in advance of said base and an outby end portion extending rearwardly therefrom, an idler on said mobile base adjacent the forward end thereof, an idler on said first turntable beneath said first mentioned idler and disposed adjacent the rear end thereof, vertically spaced idlers on said second turntable, the uppermost of said idlers having the belt reeved thereabout and the lowermost of said idlers on said second turntable having the lower run of the belt cooperating with the uppermost of said idlers on said second turntable to reeve thereabout, said idler on said base reeving the upper run of the belt in cascade relation with respect to the bight of the belt as it passes over the uppermost of said idlers on said second turntable, and said idler on said first turntable cooperating with the lowermost idler on said second turntable to form a bight in the lower run of the belt as it travels about the lowermost of said idlers on said second turntable, and means operated by lateral adjustable movement of the inby end portion of the belt for moving said idler on said first turntable therewith and for turning said second turntable at half the angle of lateral adjustable movement of the belt, comprising facing arcuate racks on said base and first turntable and pinions meshing therewith and rotatably supported on said second turntable.

11. A conveyor articulator comprising a mobile base having two coaxial turntables rotatably mounted thereon, an endless conveyor belt supported on said turntables and having an inby end portion extending in advance of said base and an outby end portion extending rearwardly therefrom, an idler on said mobile base adjacent the forward end thereof, an idler on said first turntable beneath said first mentioned idler and disposed adjacent the rear end thereof, vertically spaced idlers on said second turntable, the uppermost of said idlers having the belt reeved thereabout and the lowermost of said idlers on said second turntable having the lower run of the belt reeved thereabout, said idler on said base cooperating with the uppermost of said idlers on said second turntable to reeve the upper run of the belt in cascade relation with respect to the bight of the belt as it passes over the uppermost of said idlers on said second turntable and said idler on said first turntable cooperating with the lowermost idler on said second turntable to form a bight in the belt as it travels about the lowermost of said idlers on said second turntable, and means operated by lateral adjustable movement of the inby end portion of the belt for moving said idler on said first turntable therewith and for turning said second turntable at half the angle of lateral adjustable movement of the belt, comprising facing arcuate racks on said base and first turntable and pinions meshing therewith and rotatably supported on said second turntable, said idlers on said second turntable having a plurality of chordal shafts extending therealong, and rollers journaled on said shafts forming transverse rolling faces on said idlers.

12. In an articulator for conveyors, an endless conveyor belt having an inby and outby end, an articulator frame positioned intermediate the ends of said conveyor belt and forming an intermediate support for the upper and lower runs of the belt and accommodating lateral angular adjustment of the inby end of the belt with respect to the outby end thereof, individual sets of longitudinally spaced first and second idlers for the upper run of the belt, longitudinally spaced first and second idlers for the lower run of said belt, means mounting the first of said idlers for the upper and lower runs of the belt for lateral angular movement at half the angle of lateral movement of the inby end of the belt, upon lateral adjustable movement of the inby end of the belt, individual mounting means for the second of said idlers for the upper and lower runs of the belt for maintaining the axes of rotation of said second idlers perpendicular to the longitudinal axes of the outby and inby ends of the belt respectively, during lateral swinging movement of the inby end of the belt.

13. In an articulator for conveyors, an endless conveyor belt having an inby and an outby end and an upper material carrying run and a lower return run, an articulator frame positioned intermediate the ends of the conveyor belt and forming a support for the upper and lower runs of the belt and accommodating lateral angular adjustment of the inby end of the belt with respect to the outby end thereof, individual sets of longitudinally spaced first and second upper and lower idlers for the upper and lower runs of said belt, means mounting the first of said upper and lower idlers for lateral angular movement at half the angle of lateral swinging movement of the inby end of the belt upon lateral swinging movement thereof, individual mounting means for the second of said upper and lower idlers for maintaining the axes of rotation of said idlers perpendicular to the longitudinal axes of the outby and inby ends of the belt respectively during lateral angular adjustment thereof, and said first idlers for the upper and lower runs of the belt having rollers extending from the face thereof and mounted thereon for rotation about chordal axes and accommodating side shifting of the belt to form angular bights therein upon lateral angular movement of said idlers.

14. In an articulator for belt conveyors, an endless belt having an inby end and an outby end, a frame, upper and lower sets of longitudinally spaced first and second horizontal shafts mounted on said frame and having idlers thereon, the idlers on the upper set of horizontal shafts having the upper run of the belt reeved thereabout and the idlers on the lower set of horizontal shafts having the lower run of the belt reeved thereabout, the second shaft of said upper set of shafts being held from lateral movement with respect to said frame, the first shaft of said upper set of shafts being mounted for angular movement about a vertical axis at half the angle of adjustment of the inby end of said belt upon lateral adjustable movement thereof, the first shaft of said lower set of shafts being angularly movable about said vertical axis with the first shaft of said upper set of shafts, and the second shaft of said lower set of shafts being movable about said vertical axis at the angle of lateral adjustment of the inby end of the belt upon lateral movement thereof.

References Cited in the file of this patent

FOREIGN PATENTS 28,794     France               Dec. 29, 1924

UNITED STATES PATENT OFFICE
CERTIFICATE OF CORRECTION

Patent No. 2,873,021                      February 10, 1959

Cedric E. McWhorter

It is hereby certified that error appears in the printed specification of the above numbered patent requiring correction and that the said Letters Patent should read as corrected below.

Column 7, line 33, after "said", first occurrence, insert -- second --; column 9, lines 7 to 9 should read as follows instead of as in the patent:

-- the belt reeved thereabout, said idler on said base cooperating with the uppermost of said idlers on said second turntable to reeve the upper run of the belt in cas- --.

Signed and sealed this 2nd day of June 1959.

(SEAL)
Attest:

KARL H. AXLINE
Attesting Officer

ROBERT C. WATSON
Commissioner of Patents